April 30, 1963  R. E. MOTTIN  3,087,595
MECHANICAL LOADER AND CONVEYOR MECHANISM FOR HANDLING
RELATIVELY SMALL AND BREAKABLE ARTICLES
Filed Dec. 3, 1959  5 Sheets-Sheet 3

INVENTOR.
RALPH E. MOTTIN
BY
Whittemore Hulbert
& Belknap
ATTORNEYS

April 30, 1963  R. E. MOTTIN  3,087,595
MECHANICAL LOADER AND CONVEYOR MECHANISM FOR HANDLING
RELATIVELY SMALL AND BREAKABLE ARTICLES
Filed Dec. 3, 1959  5 Sheets-Sheet 4

INVENTOR.
RALPH E. MOTTIN
BY
ATTORNEYS

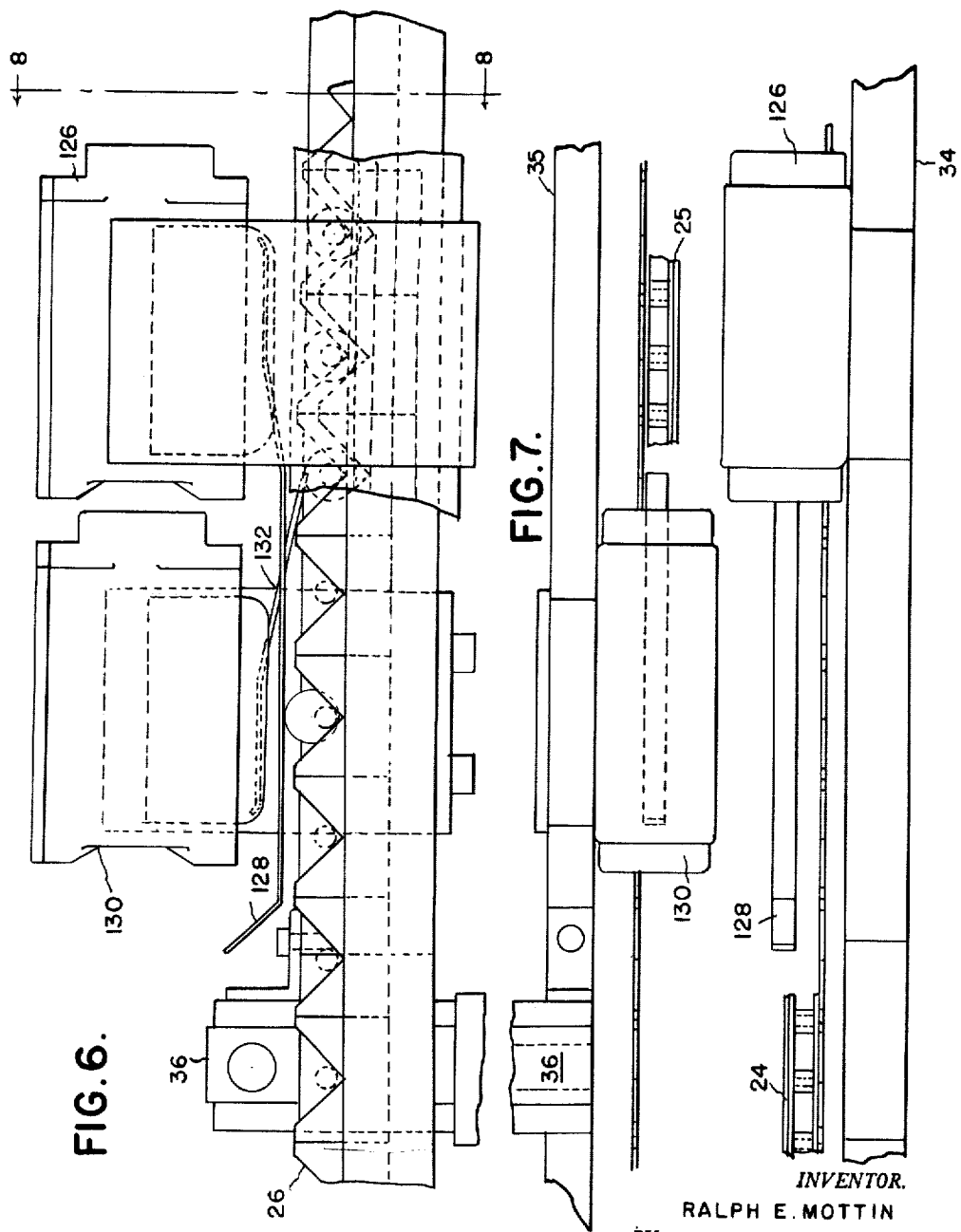

United States Patent Office 3,087,595
Patented Apr. 30, 1963

3,087,595
MECHANICAL LOADER AND CONVEYOR MECHANISM FOR HANDLING RELATIVELY SMALL AND BREAKABLE ARTICLES
Ralph E. Mottin, Taylor, Mich., assignor to Parke, Davis & Company, Detroit, Mich., a corporation of Michigan
Filed Dec. 3, 1959, Ser. No. 857,150
13 Claims. (Cl. 198—20)

This invention relates to a conveying system for moving relatively small articles from a feeder mechanism or loading station to a selected operational position at another station. More particularly, this invention relates to a loader mechanism wherein relatively small articles are taken from a loading station and are distributed to a receiving station. This is accomplished by utilizing vertically moving fingers which receive the individual articles from the feeder mechanism and deposit them one by one onto a moving endless conveyor. The loading device or mechanism operates automatically to receive and transfer a supply of relatively small articles from a feeder mechanism, which carries the articles in an end-to-end position, to an independent transfer mechanism which carries the articles in a side-by-side position without jamming, piling, breaking, spilling, or otherwise injuring or marking any of the articles.

As an example, the articles may be ampoules, bottles, metal parts, glass or plastic envelopes, electronic tubes, electric light bulbs or similar small articles. This invention will be discussed in its application to automatically transferring ampoules utilized in the pharmaceutical industry, although it should be understood that the invention is readily applicable for handling similar small articles.

The ampoules under consideration are unfilled and unmarked although it should be understood that filled ampoules may also be utilized. The empty ampoules are taken from the loading mechanism by the endless conveyor to another station, as an example, to a printing station where each ampoule is raised for a brief period from the conveyor on a four-wheel support to a fixed predetermined position to permit rotatable contact with the printer mechanism which has a laterally moving printing screen. When in this position the ampoule rotates about its vertical axis receiving a printed impression of ceramic base ink after which the ampoule is lowered back onto the conveyor and carried to a discharge station. The ampoule is discharged from the endless conveyor to another conveyor which passes through a lehr in which the heat fuses the ceramic base ink impression permanently to the ampoule. "Ground-glass" ink is one example of a ceramic base ink.

The term "label" or "print" is used throughout the specification to include printing, marking, impressing, or otherwise affixing any kind or type of a designation to an ampoule or similar article.

The above-described operation, and particularly the loading mechanism associated therewith, is operated automatically and usually requires no special attention except for occasional maintenance purposes.

It is, therefore, an object of the present invention to provide an automatic loader mechanism for transferring relatively small articles from a feeder mechanism, which has the articles in an end-to-end position, to an independent transfer mechanism which carries the articles in a side-by-side position without jamming, piling, breaking, or otherwise injuring or marking any of the articles.

It is another object of the invention to provide an automatic loader mechanism which has vertically moving fingers which receive the individual articles from a feeder mechanism and deposit the articles one-by-one onto a moving conveyor.

A further object of the invention is to provide an endless chain conveyor having side guide rails which may be adjusted to suit different size articles.

A still further object of the invention is to provide a conveyor mechanism having automatic switch means associated therewith for terminating the flow of articles thereto when one of the articles on the conveyor mechanism is not properly oriented or when a similar emergency situation has occurred.

Another object of the invention is to provide a conveyor mechanism utilizing automatic switch means for stopping the printing apparatus when a series of articles are missing from the conveyor mechanism.

Still another object of the invention is to provide an improved chain conveyor mechanism utilizing curved tracks so that the chains are always pushing down on the tracks.

A further object of the invention is to provide an improved chain conveyor mechanism utilizing a pair of adjustable curved tracks, each track having a chain that is continuously pushing down on the track, said mechanism being designed so that the articles moving therethrough are held in three directions to prevent shifting of the articles with respect to the chains.

A still further object of the invention is to provide a conveyor mechanism having a pair of chain and curved track assemblies and a hub discharge mechanism on one end of the assembly which utilizes retainer means for holding the articles as they move around the hub through approximately 180° to a discharge station without sliding, dropping, or smearing any of the articles.

Another object of the invention is to provide an automatic loader and a conveyor mechanism which lend themselves admirably to applications for handling relatively small articles and where reliability in operation, economy and simplicity of construction and minimum of maintenance are essential.

FIGURE 6 is a side elevation of the safety switch mechanism associated with the conveyor.

FIGURE 7 is a top view of the mechanism shown in FIGURE 6.

FIGURE 9 is a view of the sprocket face.

FIGURE 10 is a perspective view of the loading device.

Figure 1:
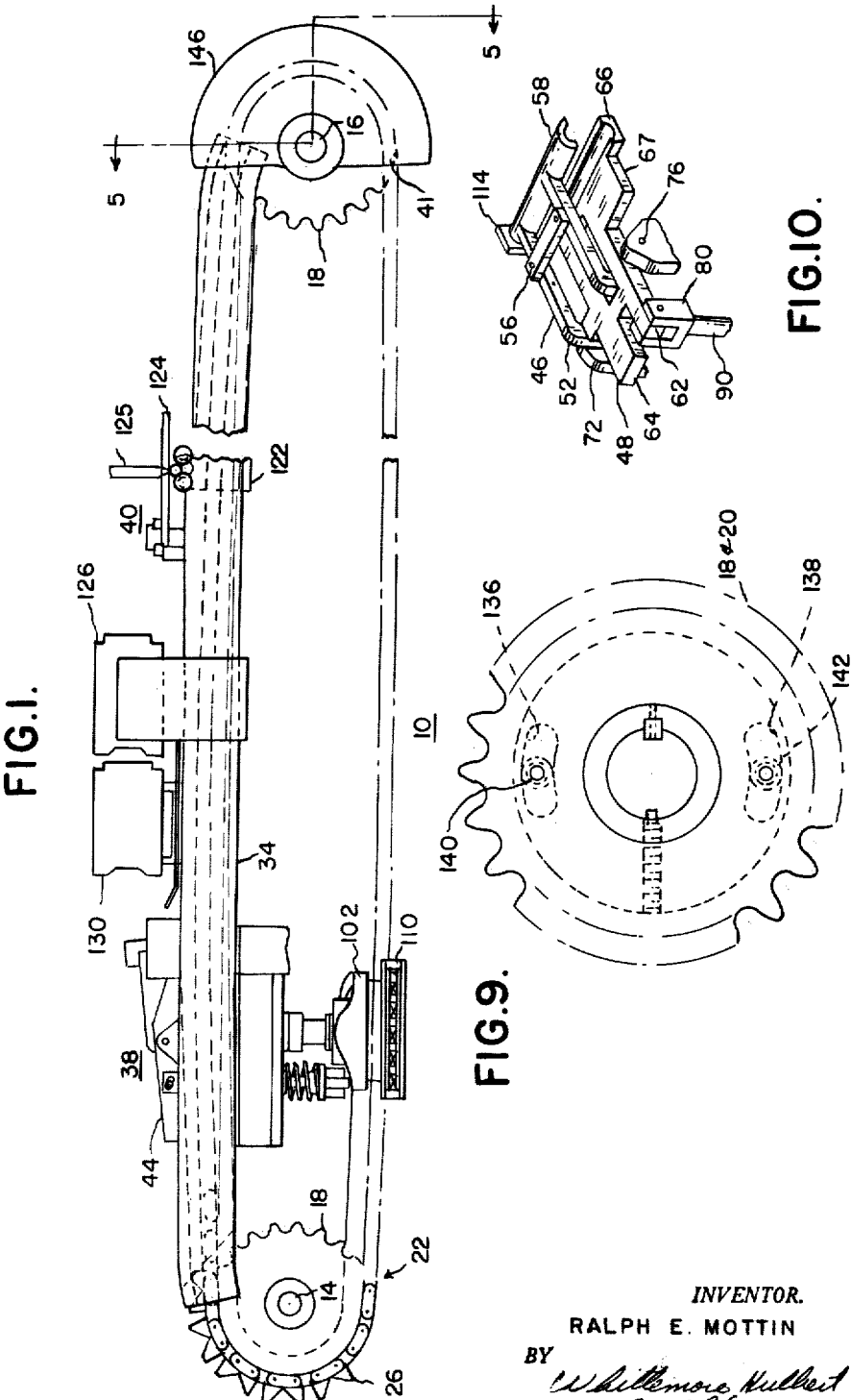
FIGURE 1 is a side elevation of the conveying mechanism.

FIGURE 1 shows an elevational view of a conveyor system designated by the numeral 10. The conveyor system 10 is supported by an appropriate structural steel frame, not shown, which raises the conveyor 10 to a suitable distance off the ground so as to interconnect its operation with a feeding conveyor, not shown, which operates perpendicularly to the conveyor 10.

Figure 5:
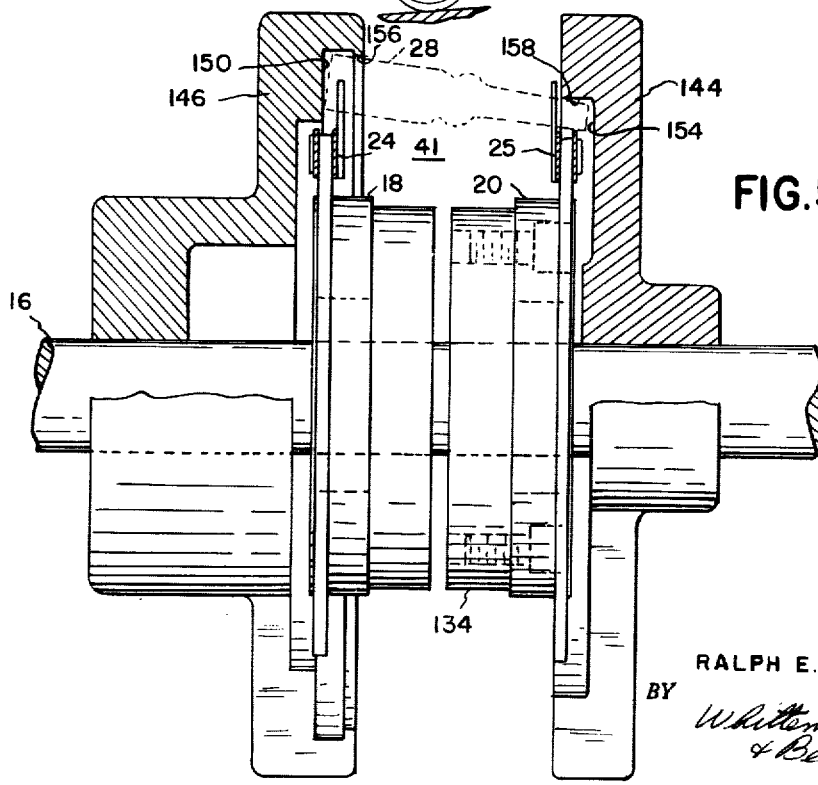
FIGURE 5 is a view taken on the line 5—5 of FIGURE 1 showing partly in section the contour of the sprockets, chains, and associated hub mechanism.

The shafts 14 and 16 located at opposite ends of the conveyor 10 each carry a pair of sprockets 18 and 20 as is best shown in FIGURE 5. The shafts are mounted on the frame of the conveyor 10. A conveyor 22 is driven by the sprockets through conventional chain driving mechanism not shown. The conveyor 22 is usually of the endless type and is composed of a pair of chains 24 and 25 which are mounted around the sprockets. The load carrying portions of the chains are supported by curved tracks as will be subsequently described. Chains 24 and 25 consist of a plurality of links 26 for transferring the ampoules 28 from a loading station to a printing station and then to a discharge station.

It will be observed that the ampoule 28 is cylindrical in cross section throughout, having a large end 29 and a small end 29a. It is important that the ampoule 28 be carried from the loading device to the printing station in a horizontal position in order that the print is properly applied to the ampoule.

A pair of conveyor guide rails or tracks 30 and 32 are provided with a longitudinal extending opening 31 and 33 respectively. The tracks 30 and 32 are curved from the center line of shaft 14 to the center line of shaft 16 with the highest point or crown of the tracks being under the printing station as will be subsequently described. The crowned or curved tracks 30 and 32 may be considered as a section of a large drum with the chains 24 and 25 located in the track openings so as to continuously push down against the tracks. Such a construction has effectively eliminated extra chain movement or "rippling" which occurs when a chain is used on a flat track or rail.

Figure 8:
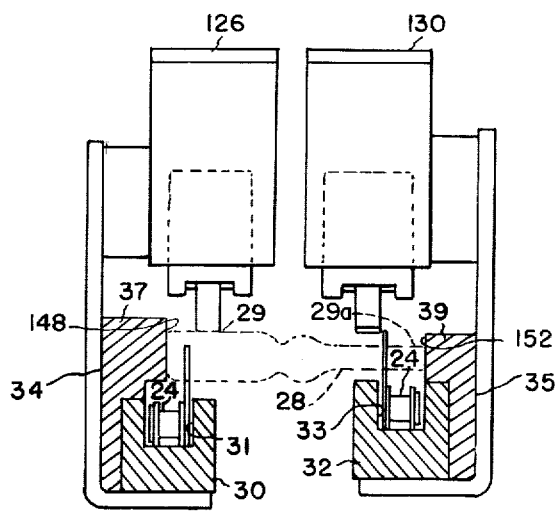
FIGURE 8 is a partial sectional view taken on line 8—8 of FIGURE 6.

Rail 32 is mounted at a higher elevation than rail 30 so as to raise the chain 25, which runs longitudinally in the groove 33, to compensate for the difference in radius between the large and small ends of the ampoule 28 and thereby maintain the ampoule in a horizontal position. On the outer sides of the rails 30 and 32 are located guide members 34 and 35 which are spaced parallel to each other at a distance slightly in excess of the width of the ampoule. The guide members 34 and 35 are notched so as to partly engage the top and outer sides of the rails 30 and 32. It should be observed by referring to FIGURES 3 and 8 that the top surfaces 37 and 39 of guide members 34 and 35 respectively are at the same elevation. This is due to the difference in height of members 34 and 35.

The track and guide rail assemblies are shaped and designed to retain the chains in three directions. The guide rails prevent the ampoules from shifting with respect to the chains and insure that the ampoules register with the printing station with the same degree of accuracy in order that the printing will start at a fixed distance from the end of each ampoule.

The conveyor system 10 may be divided into the following sections for discussion purposes only: feeder section 36, which forms no part of the present invention; receiving and loading station 38; printing station 40; and a discharge section 41.

The ampoules 28, as mentioned before, are transferred from the feeder section 36 to the loading station 38 by a belt conveyor or other means not shown, which moves substantially perpendicular to the conveyor 10 and which carries the ampoules 28 in an end-to-end position. In other words, the large end 29 of the lagging ampoule follows the small end 29a of the leading ampoule. The feeder section 36 includes a pneumatic ejection nozzle or orifice 42, as is disclosed and described as part of my copending application, "Automatic Feeder Mechanism for Orienting Relatively Small Articles," filed November 16, 1959, U.S. Serial No. 853,354.

Figure 2:
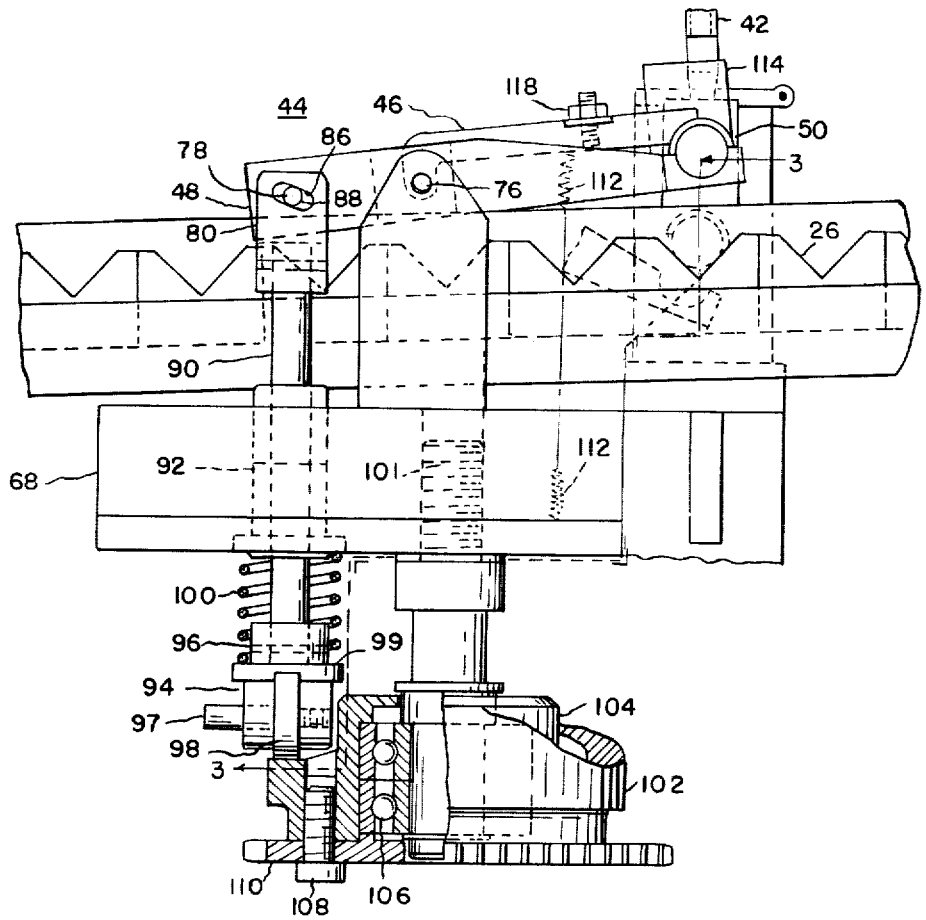
FIGURE 2 is an elevational view, partly in section of the automatic loader mechanism.
Figure 3:
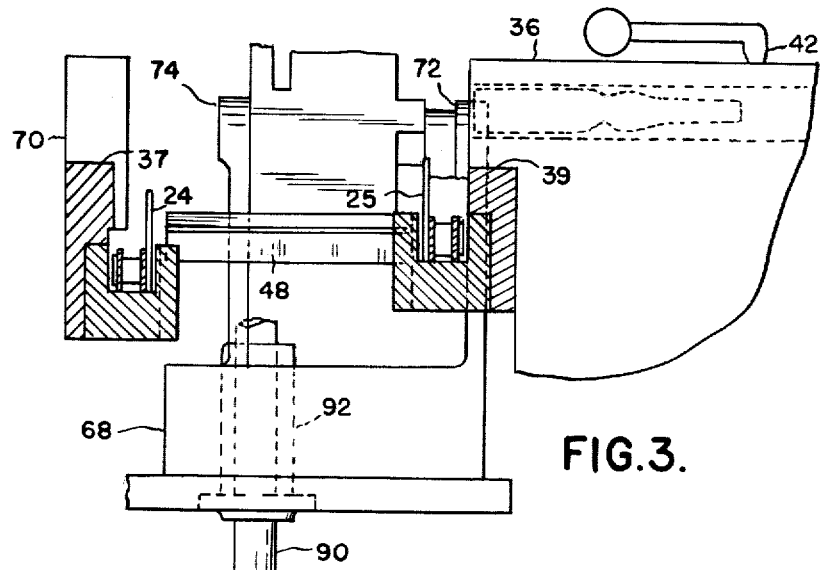
FIGURE 3 is a sectional view taken on the line 3—3 of FIGURE 2.

The orifice 42, shown in FIGURES 2 and 3, is connected to a continuous source of air. The purpose of the orifice 42 is to impart to each of the ampoules 28 prior to entering the loading station 38 a sufficient velocity so that the ampoule 28 readily leaves the feeder 36 without jamming or breaking. Such an arrangement facilitates rapid loading or filling of the loading section 38. The pressurized air floats the ampoules 28 off the bottom of the feeder section 36 at the point of ejection and thereby reduces the friction between the bottom plate of the feeder section 36 and ampoule 28. The ampoules are ejected by air to readily move the ampoules one by one from the end of the feeding section 36 into the loading mechanism 38 in timed sequence so as to prevent unnecessary delay and to further prevent breaking, jamming, or otherwise injuring the ampoules 28.

Figure 4:
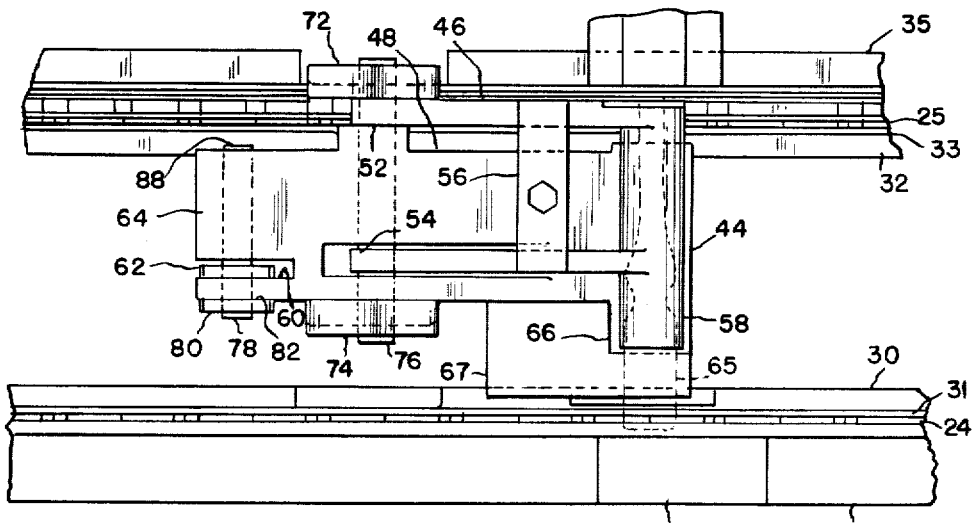
FIGURE 4 is a top view of the loader mechanism shown in FIGURE 2.

FIGURES 2, 4 and 10 show the appropriate details of the loading mechanism 44 which is included as part of the loading station 38. The mechanism 44 consists, in essence, of a pair of movable fingers which are moved in timed relationship with the chain conveyor 22. The movable finger members include an upper member 46 and a lower member 48. Finger members 46 and 48 define an ampoule holding device 50 which takes an individual ampoule as it is ejected from the feeder mechanism 36 and places the ampoule 28 in the links 26 of the conveyor 22.

The upper finger member 46 has a pair of spaced arm elements 52 and 54 having a connecting strip or bridge 56 therebetween. A concave semi-cylindrical member 58, which forms part of the holding device 50, is located on one end of the member 46. Member 58 prevents bouncing of the ampoule after ejection. The lower finger member 48 has a slot 60 on one end thereof which divides said end into parts 62 and 64. A concave semi-cylindrical ampoule holding member 66 is formed on the other end of the lower finger member 48 and defines with the semi-cylindrical member 58 the ampoule holding device 50. In the event longer ampoules 65 are utilized, an extension member 67 is added to the lower finger as is shown in FIGURE 4. This will be explained later on in the specification.

A bracket 68 is secured to the frame mechanism and has thereon a pair of upwardly extending members 72 and 74 which are in line with each other but spaced therefrom, as is shown in FIGURES 3 and 4. A pivot pin 76, as is best illustrated in FIGURE 4, extends through the element 72, parts 62 and 64 of the lower finger, arms 52 and 54 of the upper finger, and the other upwardly extending member 74. Both the lower and upper fingers 46 and 48 are pivotally connected through the pin 76 and movable with respect thereto.

A pin and slot connection 78 is provided for the specific purpose of permitting movement of the lower finger 48. The pin and connection 78 is provided through a bracket 80 having an open center portion 82 in which is inserted part 62 of the lower finger member 48. The walls 84 forming the opening 82 have slots 86 provided therein. A pin 88 is inserted through part 62, slots 86, and the other part 60. The bracket 80 is connected to a vertically mounted rod 90, which extends through a removable cylindrical bushing 92 which is located in the frame 68, as is best illustrated in FIGURE 2. At the lower end of the rod 90 is located another bracket 94 which is pin connected to the rod 90 through a pin 96. A roller 98 is rotatably mounted on the bracket 94 through a pin 97. The bracket 94 has a spring abutment surface 99 which provides a seat for the spring 100 on one end thereof. The other end of the spring 100 engages the frame 70 so as to continuously urge the bracket 94 and the rod 90 in a downward direction.

Mounted adjacent to the rod 90 is a cam carrying shaft 101 which has one end threadedly inserted into the frame 68 and the other end carrying a cam 102. The cam 102 has a hub portion 104 which has located thereon a pair of bearings 106. The cam 102 has a screw connection 108 with a chain-driven sprocket 110 which operates in timed sequence with the conveyor 22. Screw connection 108 holds sprocket 110 on the cam 102, and retains bearings 106 in a fixed position.

From FIGURE 2, it is apparent that the cam 102 is conventionally designed to provide high and low points. The chain mechanism rotates the cam 102 so that the high points of the cam 102 will raise the roller 98 and rod 90, compress the spring 100, and lower the semi-cylindrical member 66 to an unloading position so as to deposit an ampoule on the conveyor. When the low points of the cam 102 are in contact with the roller 98, the spring 100 returns the finger 46 to a loading position to receive an ampoule from the feeding conveyor.

More specifically, the high point of the cam 102 raises the pivoted end of the lower finger 48 through the pin connection 78 thereby lowering the ampoule holding end to an unloading position. When the low point of the cam 102 is in contact with the roller 98 and rod 90 the spring 100, which had been previously compressed during the unloading operation, returns the lower finger 48 to its original position by lowering the pivoted end thereby raising the ampoule holding end to a loading position. When the lower finger moves to a loading position, it carries with it the upper finger 46. The ampoule 28 is then ejected into the loading device 50. The high part of the cam will have then gradually rotated around into contact with the roller 98 so that the roller 98 and rod 90 are moved upwardly compressing the spring 100 and lowering the finger 48 to an unloading position. In this position, the ampoule is placed on the conveyor links 26 as is shown by the hidden lines of FIGURE 2. FIGURE 3 shows the lower finger 48 in its lowest position.

The upper finger 46 follows the lower finger 48 due to a spring 112 which pulls the upper finger 46 to a lower position. The spring 112 is connected to the frame 68 and to the upper finger 46. The upper finger 46 carries with it a vertically extending member 114 which moves across the discharge point of the feeding section 36 so as to break friction contact between two successive ampoules 28 and to terminate the flow of ampoules until the lower finger 48 has again moved into a loading position to receive another ampoule 28. The movement of the fingers 46 and 48 is determined by the position of the cam 102. The guide member 35 has an upper top surface 39 which engages a stop member 118 provided on the upper finger 46 so as to limit the downward movement of the top finger 46 and to insure that an ampoule is not ejected from the feeding conveyor during the unloading portion of the device 44. The surface 39 is located at a position which prevents the upper finger 46 from interfering with the indexing of the mechanism. In other words, the top surface of the ampoule 28 must clear the bottom surface of the upper finger 46.

A Teflon stop block 70 is mounted on the top surface 37 of the guide member 34 directly opposite the place where the ampoules are ejected. The Teflon stop block limits the outward travel of the ampoules 28 and centers each ampoule 28 in the holding device 50. By utilizing a stop block made of Teflon, the friction contact between the ampoule and the block has been reduced thereby eliminating the vertical drag and permitting the ampoule to be rapidly placed on the links so that the lower finger 46 may move to a loading position in a minimum amount of time.

FIGURE 3 shows that chain 25 is at a higher elevation than chain 24. This difference in elevation is maintained as the ampoules progress to the printing station 40 shown in FIGURE 1. Both guide rails and guide members are sufficiently crowned, as has been previously explained, so that the highest point of the crown is under the printing station 40. The "crowning" effect has been exaggerated in FIGURE 1 for purposes of emphasis. Prior to the ampoules reaching the printing station 40, a pair of safety switches are provided as shown in FIGURES 6 and 7. The switch 126, which is connected to the printer 40, is mounted on the guide member 30 and has a leaf 128 which extends into the flow path of the ampoules as is best illustrated in FIGURE 6. The switch 126 is actuated to close or shut the printer 40 when a series of four ampoules are missing from the conveyor 10. This prevents an excessive amount of ink from being fed to the printing screen. The switch 126 serves as a detector and is actuated when a predetermined number of ampoules are missing from the line of flow. The number of missing ampoules utilized to actuate the switch 126 is determined by trial and error and is based on the printer capacity to hold ink and still not affect the quality of the printing. An excessive amount of ink at the printer would cause the lagging ampoules to smear.

Another switch 130 is mounted on the guide member 35 and provides means for terminating the flow of ampoules 28 from the feeder system when a non-oriented ampoule has been detected by the actuating arm 132. Serious damage would result to the printing station 40 if the non-oriented ampoules were not detected.

After the ampoules 28 are placed on the conveyor links 26, they are moved along to the printing station 40, as is schematically shown in FIGURE 1. A wheeled support 122 raises the ampoule 28 from the links for a brief period to a fixed predetermined position to permit rotatable contact with a laterally moving silk screen printing plate 124. A squeegee 125 is mounted directly above the label which is impressed into the silk screen. The ceramic base ink is fed to the screen so that as the ampoule rotates about its vertical axis, ink is transferred to the ampoule. After the ampoule has had the label printed or screened thereon, it is lowered onto the links and moved therefrom to a discharge station where the ampoule is discharged therefrom to a separate conveyor which passes through an annealing oven in which the heat fuses the ink impression permanently to the ampoule. The oven is driven by the same drive mechanism utilized on the conveyor and loader.

After the ampoule has had the label impressed thereon, it is necessary for the continuous conveyor 22, as it advances to the point of discharge, to pass over and around the sprockets 18 and 20, at the discharge end of the conveyor.

As mentioned previously, the highest point of the "crowned" rails is immediately below the printing plate 124. The rails and chains are then gradually brought to the same elevation as is shown in FIGURE 5 so that the chains may move readily around the sprockets 18 and 20. This results in the tilting of the ampoules as they pass around the discharge hub mechanism.

FIGURE 5 shows the rotatable shaft 16 having mounted thereon a pair of rings 134 which are keyed to the shaft. Sprockets 18 and 20 are angularly adjustable on the rings 134. The sprockets 18 and 20 have slots 136 and 138 provided therein, as shown in FIGURE 9, which receive bolts 140 and 142 respectively so as to provide angularly adjustable means between the rings and sprockets. This adjustment feature provides for the obtaining of proper timing between the chains and the loading station.

The inside hub 144 and the outside hub 146 are attached to guide rails 32 and 30 respectively by screws or other fastening means so that the ampoules physically carried around the hub through approximately 180° without sliding, dropping, or smearing any of the ampoules. Face 148 of guide member 34 is in line with face 150 of hub 146 while face 152 of guide member 35 is in line with face 154 of hub 144. Hub 146 through face 150 and shoulder 156 and hub 144 through face 154 and shoulder 158 provide retaining means for holding the ampoule in a predetermined fixed position as it is moved around the end sprockets approximately 180° to a discharge position. At this position, the ampoules are deposited gently and properly positioned into fusion-like conveyor buckets not shown.

The conveyor 22 may be adjusted to handle ampoules of various sizes. FIGURE 5 shows the hub members spaced to handle ampoules of approximately two inches in length. The outer hub members 146, rail 30, and guide member 34 may be adjusted on shafts 14 and 16 for various positions. The guide members 34 and 35 maintain the ampoules in the proper position on the chain conveyor.

FIGURES 2–4 are designed to handle longer ampoules. The extension member 67, previously mentioned, provides the additional support for the ampoule 65. The extension member 67 is an added attachment for the loading device 44 and may be secured to the lower finger member 46 by dowel pins or through other suitable means.

*Operation*

From the above description, the operation of the conveyor-printer is self-explanatory to those skilled in the art. However, the following brief description of the operation of the conveyor mechanism will be of help to those not familiar with the art.

The conveyor-printer functions to move the ampoules 28 from the feeder section 36 to the vertically moving fingers 46 and 48. The conveyor 22 and the loading device 44 are moved are moved in time relationship. Transferring the ampoules individually from the feeder section 36 to the conveyor 22 is accomplished by the driven cam means 102 which rotate so that when the low point of the cam is in contact with the roller 98 the finger 48 moves to a loading position. The lower finger 48 carries the upper finger 46 with it so as to uncover the feeder section 36. An ampoule 28 is deposited into the holding device 50 during the loading operation after which time the cam 102 has progressed to a point when the roller 98 and rod 90 are raised compressing spring 100. This lowers the ampoule carrying end 66 of the lower finger 48 to the conveyor links 26. The upper finger 46 follows the lower finger 48, by means of the spring arrangement 112, to a predetermined controlled surface 39 so as to prevent interference between the indexing of the ampoules on the conveyor and the bottom of the upper finger 46. The shut-off member 114 carried by the upper finger 46 breaks the friction contact between the ampoules 28 and prevents flow of ampoules from the feeder section 36.

After the ampoule has been deposited on the links 26, the ampoule is moved to the printing station 40 where each ampoule is raised from the conveyor 22 on a four-wheel support 122 to a fixed predetermined position to permit rotatable contact with the laterally moving silk screen printing plate 124. After the label has been impressed on the ampoule 28, the ampoule is lowered onto the conveyor 22 and carried to the discharge station. The ampoule 28 is discharged therefrom to a separate conveyor, not shown, which passes through an annealing oven in which the ceramic base ink is fused to the ampoule by the heat. The oven, conveyor, and loader are driven in timed relationship.

Electrically operated safety switches 130 and 126 are provided intermediate the loading station 38 and the printing station 40. Switch 126 detects four or more missing ampoules while switch 130 detects non-oriented ampoules.

This invention, including the automatic loader and the conveyor mechanism, has many important features which lend themselves admirably to applicatons for handling relatively small articles. The automatic loader mechanism transfers the small articles from a feeder mechanism, which has the articles in an end-to-end position, to an independent transfer mechanism which carries the articles in a side-by-side position to a printing station without jamming, piling, breaking, or otherwise injuring or marking any of the articles.

The conveyor mechanism utilizes a pair of curved tracks, with each track having a longitudinal groove therein in which is located a chain which moves through the groove and exerts a continuous downward force on the track. This construction has eliminated excessive movement or rippling of the chain. This feature is important when the mechanism is indexed. The shape and contour of the tracks retain the chains in three directions. The guide members hold the ampoules in a side-by-side position on the conveyor links and prevent slippage of the ampoules relative to the chain. This insures that the ampoules are delivered to the printing station in the same position at all times.

The discharge hub mechanism which is attached to the guide rails is so designed as to provide retaining means for carrying the ampoules around the sprockets to the discharge station without dropping or injuring the ampoules.

The drawings and the foregoing specification constitute a description of the improved mechanical loader and conveyor mechanism for handling relatively small and breakable articles in such full, clear, concise and exact terms as to enable any person skilled in the art to practice the invention, the scope of which is indicated by the appended claims.

What I claim as my invention is:

1. A conveyor system for transferring articles comprising a first conveyor which moves the articles in an end-to-end position, a second conveyor moving substantially perpendicular to said first conveyor, and a pair of finger elements movable between said conveyors for receiving the articles endwise between said finger elements individually from said first conveyor and placing the articles on said second conveyor in a side-by-side position, one of said finger elements being movable away from the other to permit egress of the article sideways from between said finger elements when the article is moved by said second conveyor.

2. A conveying system for transferring articles comprising a first conveyor which moves the articles in an end-to-end position, a second conveyor moving substantially perpendicular to said first conveyor, and an upper and a lower finger element movable about a common pivot connection, said elements defining a holding portion into which said articles are individually inserted at the end of said first conveyor and which places the articles on said second conveyor in a side-by-side position.

3. A conveying system for transferring relatively small articles between a receiving station and a discharge station comprising a first conveyor which moves the articles from said receiving station in an end-to-end position, a second conveyor moving substantially perpendicular to said first conveyor and carrying the articles to the discharge station, means having separable portions forming an open-ended pocket for the articles endwise individually from said first conveyor, said separable portions being movable to carry the articles into the path of travel of said second conveyor to place the articles on said second conveyor in a side-by-side position and means fixed relative to the path of movement of said separable portions positioned to engage one of said separable portions to open said separable portions during movement thereof to permit egress of the articles sideways therefrom by engagement of the article with said second conveyor.

4. A conveying system for transferring relatively small articles between a receiving station and a discharge station comprising a first conveyor which moves the articles from said receiving station in an end-to-end position, a second conveyor moving substantially perpendicular to said first conveyor, and carrying the articles to the discharge station, and a pair of vertically moving finger elements having a common pivot connection, said elements taking the articles individually from said first conveyor and placing the articles on said second conveyor in a side-by-side position.

5. A loader mechanism for use between a source of ampoules or the like and a conveyor, said source having the ampoules in an end-to-end position comprising a first finger member having holding means for receiving an ampoule from the source at a loading position and discharging the ampoule onto the conveyor at an unloading position, a second finger member movable relative to said first finger member, stop means carried by said second finger member for terminating flow of ampoules from said source when the first member is at a position other than said loading position, means for moving said first member to a loading position, said first member carrying with it said second member to permit an ampoule to be ejected into said holding means during the loading position, and means for moving said first member to the unloading position so as to place the ampoules in a side-by-side position on said conveyor.

6. A loader mechanism for use between a source of ampoules or the like and a conveyor, said source having the ampoules in an end-to-end position comprising a first finger member having holding means for receiving an ampoule from the source at a loading position and discharging the ampoule onto the conveyor at an unloading position, a second finger member movable relative to said first finger member, stop means carried by said second finger member for terminating flow of ampoules from said source when the first member is at a position other than said loading position, cam means for moving said first member to a loading position, said first member carrying with it said second member to permit an ampoule to be ejected into said holding means during the loading position, and cam means for moving said first member to the unloading position so as to place the ampoules in a side-by-side position on said conveyor.

7. A loader mechanism for use between a source of ampoules or the like and a conveyor, said source having the ampoules in an end-to-end position comprising a first finger member having holding means for receiving an ampoule from the source at a loading position and discharging the ampoule onto the conveyor at an unloading position, a second finger member movable relative to said first finger member, stop means carried by said second finger member for terminating flow of ampoules from said source when the first member is at a position other than said loading position, means for moving said first member to a loading position, said first member carrying with it said second member to permit an ampoule to be ejected into said holding means during the loading position, means for moving said first member to the unloading position so as to place the ampoules in a side-by-side position on said conveyor and resilient means for urging said second finger member to a position to close said source with said stop means until said first member has nearly reached said loading position.

8. A loader mechanism for use between a source of ampoules or the like and a conveyor, said source having the ampoules in an end-to-end position comprising, first and second vertically movable finger members having holding means for receiving an ampoule from the source at a loading position and discharging the ampoule onto the conveyor at an unloading position, stop means carried by said second finger member for terminating flow of ampoules from said source when the first member is at a position other than said loading position, means for moving said first member to said loading position, said first member carrying with it said second member to permit an ampoule to be ejected into said holding means during the loading position, and means for moving said first member to the unloading position so as to place the ampoules in a side-by-side position on said conveyor.

9. A loader mechanism for use between a source of ampoules or the like and a conveyor, said source having the ampoules in an end-to-end position comprising, first and second vertically movable finger members having holding means for receiving an ampoule from the source at a loading position and discharging the ampoule onto the conveyor at an unloading position, stop means carried by said second finger member for terminating flow of ampoules from said source when the first member is at a position other than said loading position, means for moving said first member to said loading position, said first member carrying with it said second member to permit an ampoule to be ejected into said holding means during the loading position, means for moving said first member to the unloading position so as to place the ampoules in a side-by-side position on said conveyor and spring means for urging said stop means into a position to terminate the ejection of ampoules from said source until said first member has nearly reached said loading position.

10. A loader mechanism for use between a source of ampoules or the like and a conveyor, said source having the ampoules in an end-to-end position comprising, first and second vertically movable fingers which define an ampoule carrying device, stop means on said second finger for preventing the ejection of an ampoule when the carrying device is at other than a loading position and cam actuated means connected to said first finger for raising said first finger to a loading position, said first finger carrying with it said second finger to permit an ampoule to be ejected into said carrying device during the loading position and lowering said first finger to an unloading position so as to place the ampoule on said conveyor in a side-by-side position.

11. The loader mechanism as defined in claim 10 in which said vertically movable fingers and said conveyor are operated in timed sequence.

12. A conveying system for transferring articles comprising a first conveyor adapted to move articles endwise to an output portion thereof, a second conveyor adapted to receive the articles in side-by-side positions and to move the articles sideways in a path transverse to the path of travel of the articles at the output portion of said first conveyor, and transfer means movable to loading position adjacent said output portion of said first conveyor and axially aligned with the articles thereon, said first conveyor being operable to move the articles endwise onto said transfer means at said loading position, said transfer means being movable towards said second conveyor to an unloading position for placing the articles on said second conveyor in side-by-side position, means for reciprocating said transfer means, said loading position comprising one end of the path of travel of said transfer means, said transfer means being movable from said loading position transversely across and beyond the path of travel of the articles on said second conveyor, said transfer means including an article support adapted to clear said second conveyor during said movement across said second conveyor whereby the articles are placed on said second conveyor and removed from said article support during said movement of said transfer means across the path of travel of the articles on the second conveyor, said second conveyor including a pair of supports spaced apart transversely of the path of travel of the articles for receiving each of the articles in side-by-side position, and said article support of said transfer means being shaped to pass between said pair of supports and to position the article on said pair of supports.

13. A conveying system for transferring articles comprising a first conveyor adapted to move articles endwise to an output portion thereof, a second conveyor adapted to receive the articles in side-by-side positions and to move the articles sideways in a path transverse to the path of travel of the articles at the output portion of said first conveyor, and transfer means movable to loading position adjacent said output portion of said first conveyor and axially aligned with the articles thereon, said first conveyor being operable to move the articles endwise onto said transfer means at said loading position, said transfer means being movable towards said second conveyor to an unloading position for placing the articles on said second conveyor in side-by-side position, means for reciprocating said transfer means, said loading position comprising one end of the path of travel of said transfer means, said transfer means being movable from said loading position transversely across and beyond the path of travel of the articles on said second conveyor, said transfer means including an article support adapted to clear said second conveyor during said movement across said second conveyor whereby the articles are placed on said second conveyor and removed from said article support during said movement of said transfer means across the path of travel of the articles on the second conveyor, said second conveyor being moved intermittently and including article supporting means adapted to receive the articles individually in side-by-side positions, said transfer means being moved in timed relation with respect to said second conveyor for bringing the article into registration with said article supporting means thereof when the latter means are stationary, said second conveyor moving the article on the latter means when said transfer means has moved therebeyond.

References Cited in the file of this patent
UNITED STATES PATENTS

| | | |
|---|---|---|
| 668,079 | Baker | Feb. 12, 1901 |
| 1,737,762 | Howe | Dec. 3, 1929 |
| 1,869,354 | Bletso | Aug. 2, 1932 |
| 2,357,358 | Read | Sept. 5, 1944 |
| 2,525,305 | Lombard | Oct. 10, 1950 |
| 2,546,318 | Rayburn | Mar. 27, 1951 |
| 2,603,340 | Warren | July 15, 1952 |
| 2,991,881 | Craven | July 11, 1961 |

UNITED STATES PATENT OFFICE
CERTIFICATE OF CORRECTION

Patent No. 3,087,595                                April 30, 1963

Ralph E. Mottin

It is hereby certified that error appears in the above numbered patent requiring correction and that the said Letters Patent should read as corrected below.

Column 8, line 42, after "for" insert -- receiving --; column 9, line 50, for "amopules" read -- ampoules --; column 10, line 15, for "amopule" read -- ampoule --.

Signed and sealed this 12th day of November 1963.

(SEAL)
Attest:

ERNEST W. SWIDER                                EDWIN L. REYNOLDS

Attesting Officer                              Acting Commissioner of Patents